Dec. 13, 1960     J. ROCKOFF     2,964,421
FLOCKED OR PILE SURFACED CELLULAR ARTICLE
AND METHOD FOR ITS MANUFACTURE
Filed Oct. 23, 1957

JOSEPH ROCKOFF
*INVENTOR.*

BY.

Reuben Wolk

*ATTORNEY.*

United States Patent Office 2,964,421
Patented Dec. 13, 1960

2,964,421

FLOCKED OR PILE SURFACED CELLULAR ARTICLE AND METHOD FOR ITS MANUFACTURE

Joseph Rockoff, Dayton, Ohio, assignor to Dayco Corporation, a corporation of Ohio Filed Oct. 23, 1957, Ser. No. 691,982

4 Claims. (Cl. 117—33)

The present invention relates to cellular flexible, resilient articles utilized as cushioning materials, such as pillows, mattresses, furniture cushions, and the like, provided with pile surfaces in lieu of the fabric covers or upholstery fabrics which are generally provided as covering materials therefor.

Products of the type described, to be utilized for cushioning purposes, are generally formed of such cellular elastomeric materials as foam rubber, cellular synthetic polymers or resins such as polyurethane foams, foamed polyvinyl chloride, and the like. These materials when utilized for such purposes preferably possess an interconnected cell structure so that air may circulate therethrough and may therefore be said to "breathe." Such products are generally covered with fabrics, sheet plastic materials, or the like. These covering materials are expensive in themselves, must be prefabricated to fit, and require a considerable amount of skilled manual labor for their preparation and application. The formation of such products with an integral pile or flocked surface would provide certain economies in manufacture while at the same time result in improved appearance and utility of the product, since such piled surfaces possess a soft luxurious feel and an appearance simulating or replacing more expensive fabric materials. Thus, in the manufacture of products of the type described having such integrally united surface layers of fibers in the form of flock or pile, these coatings or coverings may be applied as a normal part of manufacture of the product whereby the formed or shaped cellular article, after its manufacture, is conveyed to pile surfacing operations with the result that a finished covered product is obtained in the normal sequence of production operations.

In general, flock or pile is applied to articles by depositing fibers of the desired type and dimensions upon the surface of a product which has previously been coated with an adhesive material, while such adhesive is in the tacky state, and thereafter allowing the adhesive to set, thereby embedding the fibers therein. The fibers may be applied in a random manner or may be aligned or oriented with the end of each fiber embedded in the adhesive. One simple and customary method of flocking is to sift or dump quantities of the flock or finely divided fibers on the adhesive treated surface of the product and subsequently to subject the material or product to vibration in a direction normal to the treated surface to assure bonding of the flock to the adhesive. When flock is applied to the product in this manner it collects on the adhesive surface as a tangled mat with most of the fibers lying flat on the adhesive and bonded in in this form by the subsequent vibration. The flock coating produced by this method has, therefore, very much the appearance of a felt. By applying the fibers in an aligned manner, a smooth, deep coat of flock is obtained having the appearance of a nap or pile surfaced material with an end of each fiber embedded and the other end of each projecting outward. Typical methods for applying fibers in an aligned manner are illustrated by numerous patents in the prior art. For example, a method very commonly used involves the provision of electrical or electrostatic fields for the alignment of the fibers. Such methods are illustrated in U.S. patents such as Nos. 2,087,260; 2,173,078; 2,223,476; 2,328,904; and others. A similar method utilizing magnetic fields is described in U.S. Patent No. 2,258,092. Various nonelectrical methods of alignment are illustrated in the prior art as exemplified by U.S. Patents Nos. 2,345,376 and 2,563,259.

Attempts to apply the fibers to cellular resilient products of the type described utilizing adhesive materials previously used by the prior art for this purpose, have not been entirely satisfactory due to the fact that the nature of the bond is not entirely permanent and that such adhesives appear to interfere with the breathing of the cellular material, thus affecting the cushioning and other characteristics of the product. Such previously used adhesive materials have also been found to form a network of cracks after curing or during use, and these adhesives also may not possess the proper tack for a sufficient length of time to permit proper application of the fibers. These previously used adhesives may also provide non-uniform films which result in uneven flocking, or else they do not possess the correct degree of flexibility to conform to the characteristics of the cellular material.

In accordance with the present invention, applicant has discovered that a particular type of adhesive incorporating a specific type of synthetic resinous polymer is especially adapted for use in the flocking of cellular resilient materials of the type described, and, in particular, in the flocking of those materials which have an interconnected cell structure in order to provide a product through which air may circulate and which may be said to breathe. Such an adhesive has also been found to provide a suitable degree and duration of tack to permit bonding of the fibers and to possess a flexibility conforming substantially to the flexibility of the surface of the cellular product so that the surface and flexing characteristics thereof will not be adversely affected. This adhesive also exhibits the characteristic of forming uniform films which will not crack after curing or during use.

The polymeric material which forms the basis for the adhesive referred to is a copolymer of butadiene and vinyl pyridine, preferably a copolymer of butadiene, styrene and vinyl pyridine. Vinylpyridine is a simplified term for the products frequently referred to as monovinylpyridines among which are included 2-vinylpyridine, 4-vinylpyridine, and various alkyl pyridines such as 2-methyl-6-vinylpyridine. This polymer is incorporated in an aqueous emulsion along with vulcanizing and other compounding ingredients. An example of such an adhesive is as follows (all parts by weight):

| | |
|---|---|
| Polymer (water emulsion of a copolymer of 70 parts of butadiene, 15 parts styrene, and 15 parts vinyl pyridine, 40 parts solids) | 250 |
| Plasticizer-modifier sodium polyacrylate | 12 |
| Sulfur (water suspension—60% sulfur) | 1.9 |
| Zinc oxide (water suspension—60% ZnO) | 4.2 |
| Accelerator (Zenite—zinc salt of mercapto benzothiazole—40% in water) | 3.7 |
| Titanium dioxide (40% suspension in water) | 53.0 |
| Accelerator (ethyl zymate-zinc diethyl dithiocarbamate—50% suspension in water) | 3.0 |

The above ingredients were intimately mixed to form a stable emulsion or suspension. The resulting water based adhesive was then utilized in forming a flocked cushion by coating a foam rubber pillow with the adhesive by spraying; the pillow was then introduced into the flocking area of a standard electrostatic flocking unit and a flock compound of three denier, 0.030 rayon fibers was applied uniformly. Coverage of from 40 to 90 square feet per pound was obtained depending on whether loose fibers were removed and reused. The product was then vulcanized or cured for 45 minutes at 200° F. and the loose flock removed by vacuuming. Abrasion tests on the product carried out by rubbing a fabric covered surface against the flock with a stroke of five inches at 21 cycles per minute resulted in 171,360 cycles before the flock was worn through. This indicated superior endurance compared with a good quality fabric cover. Similar results were obtained when the flock was applied by blowing it on to the adhesive coated surface with a spray gun, although electrostatic flocking proved to be more rapid and uniform. Similar procedures were carried out with other types of foam material, including mattresses, furniture cushions, and the like. The adhesive coating which formed the bond between the fibers and the cushion was found to be highly flexible and pervious to air. This meant that the breathing characteristics of the cellular material were not substantially impaired by the application of the adhesive coating and the flock. At the same time, the product proved to be extremely durable during flexing which occurs through use.

While the foregoing example utilizes one specific vinyl pyridine containing latex, other copolymer emulsions of butadiene with vinyl pyridine with or without styrene may be utilized in various proportions ranging from 50 to 85 parts of butadiene, 0 to 45 parts of styrene, and 10 to 45 parts of vinyl pyridine. By the same token, other conventional vulcanizing agents, compounding materials, and the like, may also be utilized.

The invention is illustrated with reference to the accompanying drawings in which.

Figure 1:
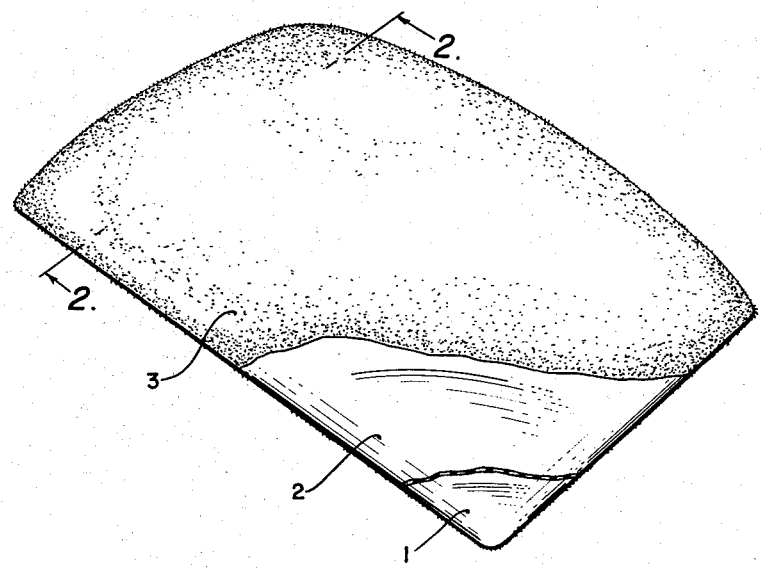
Figure 1 is a view in elevation, and partly in cross-section, of a cushion or pillow of the invention.
Figure 2:
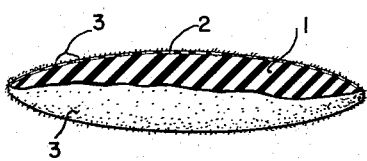
Fig. 2 is an enlarged detail view, partly in cross-section, of a portion of Fig. 1.

In the drawings, a molded cellular pillow or the like 1, is coated with a layer of adhesive 2. Thereafter the fibers 3 are applied as flock over the surface thereof in the manner described above.

It will be seen, therefore, that applicant has provided a novel cushioning member formed of cellular resilient material, in which the conventional covering material is replaced by an integrally united layer of embedded individual fibers anchored to the surface within a film of porous vulcanized adhesive material which permits the cells of the material to breathe while at the same time providing the desired degree of surface flexibility. In addition to the specific embodiments of the invention described herein, variations may be made within the skill of the artisan without departing from the spirit and scope of the invention.

I claim:

1. A flocked cellular resilient product having a body portion of cellular elastomeric material, a surface coating comprising a butadiene vinyl pyridine copolymer, and relatively short finely divided fibers embedded in said coating and forming a substantially uniform covering over the surface of said cellular material.

2. A cushioning member composed of cellular elastomeric material having an interconnected cell structure, comprising a surface coating of a vulcanized butadiene vinyl pyridine latex having finely divided fibers embedded therein and providing a fibrous surface thereover.

3. A method for the manufacture of flocked cellular resilient materials which comprises applying a surface coating of a vulcanizable butadiene vinyl pyridine copolymer latex thereover and thereafter embedding in said latex prior to the setting thereof finely divided textile fibers of relatively short length to form a continuous fibrous surface thereover, and vulcanizing said latex.

4. A foam rubber cushioning member comprising a body portion of cellular elastomeric material, a surface coating of a vulcanized butadiene vinyl pyridine latex and a plurality of finely divided fibers, one end of each of said fibers embedded in said latex and the other end exposed to provide a fibrous pile surface on said member.

References Cited in the file of this patent

UNITED STATES PATENTS

| | | |
|---|---|---|
| 2,345,376 | Bodle et al. | Mar. 28, 1944 |
| 2,402,020 | Cislak et al. | June 11, 1946 |
| 2,561,215 | Mighton | July 17, 1951 |
| 2,619,445 | Kalafus | Nov. 25, 1952 |
| 2,663,097 | Giese | Dec. 22, 1953 |